(12) United States Patent
Karstens

(10) Patent No.: US 7,234,964 B1
(45) Date of Patent: Jun. 26, 2007

(54) SYSTEMS, METHODS, AND MEDIA FOR PROVIDING VISUAL INDICATION OF A BLADE CONFIGURATION

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/312,896

(22) Filed: Dec. 20, 2005

(51) Int. Cl.
*H01R 3/00* (2006.01)

(52) U.S. Cl. .................................... 439/490
(58) Field of Classification Search ................ 439/488, 439/490; 235/487; 348/705; 709/250, 249; 386/46, 118; 361/683, 788
See application file for complete search history.

(56) References Cited

U.S. PATENT DOCUMENTS

| | | | |
|---|---|---|---|
| 5,051,870 A | | 9/1991 | Companion |
| 5,661,631 A | | 8/1997 | Crane, Jr. |
| 5,990,981 A | * | 11/1999 | Thompson et al. ......... 348/705 |
| 6,256,208 B1 | | 7/2001 | Supinski et al. |
| 6,762,932 B2 | * | 7/2004 | Regimbal et al. ........... 361/683 |
| 6,774,469 B2 | | 8/2004 | Utsumi |
| 6,851,614 B2 | * | 2/2005 | Garnett ...................... 235/487 |
| 6,915,065 B2 | | 7/2005 | Lee |
| 6,985,967 B1 | * | 1/2006 | Hipp .......................... 709/250 |
| 2003/0058311 A1 | | 3/2003 | Chen et al. |
| 2004/0089717 A1 | | 5/2004 | Harari et al. |

\* cited by examiner

*Primary Examiner*—Alexander Gilman
(74) *Attorney, Agent, or Firm*—Gregory M. Doudnikoff

(57) ABSTRACT

Systems, methods, and media for providing visual indication of a blade configuration are disclosed. Embodiments may include a visual blade configuration system with a chassis and a plurality of hot pluggable blades, where each blade is adapted to be physically connected to one or more other blades, where the physically connected blades each form a visual indication device (VID) assembly. Embodiments may also include where each blade has one or more visual indication devices (VIDs) each having a plurality of states, where each of the visual indication devices changes its state to provide a visual indication of the VID assembly associated with its attached blade. The plurality of states may include different colors, alphanumeric characters, images, symbols, patterns, number of active elements, actions, animations, etc. In a further embodiment, each visual indication device may potentially change its state in response to detection of addition or removal of a blade.

19 Claims, 5 Drawing Sheets

SYSTEMS, METHODS, AND MEDIA FOR PROVIDING VISUAL INDICATION OF A BLADE CONFIGURATION

FIELD OF INVENTION

The present invention generally relates to the field of computer servers and computer systems, such as a blade server with a chassis and a number of interconnected blades. More particularly, the present invention relates to systems, methods, and media for providing a visual indication of a blade configuration.

BACKGROUND

In today's environment, a server computer system often includes several components, such as the server itself, hard drives, or other peripheral devices. These components are generally stored in racks. For a large organization, the storage racks can number in the hundreds and occupy huge amounts of expensive floor space. Also, because the components are generally free standing components (i.e., they are not integrated), resources such as disk drives, keyboards, and monitors cannot easily be shared. Blade servers have been developed to bundle the server computer system described above into a compact operating unit. A blade server may be a high-density, rack-mounted packaging architecture for servers that provides input/output (I/O), systems management, and power to individual blades. Blades may include servers, processor nodes, storage nodes, or other components and may each plug into and operationally connect to the blade server to share in resources such as power, cooling, network connectivity, management functions, and access to other shared resources (such as a front-panel or CD-ROM drive). 'Sidecar' blades may also be attached to other parent blades to provide additional functionality to the parent blade. Child 'sidecars' may be stacked more than one deep and may include storage add-ons, PCI expansion add-ons, special function (e.g., daughter cards) add-ons, etc.

In server design, as in the design of many other types of computer systems, there is a trend towards higher densities of components. For example, it is often desirable to put a greater number of server blades into a package of given size. One feature of blade servers is that individual blades may be 'hot swapped' without affecting the operation of other blades in the system. An administrator or other user may simply remove one blade (such as one that is inoperable or that will be replaced) and place another in its place. Such flexibility, however, comes at the price of additional complexity as to the current configuration of a system. When combined with the higher densities of modern systems, users may have difficulty determining the current configuration of the blades in a blade server. This problem may be exacerbated by the typical chassis design that keeps hidden from the user the connections between blades and sidecars when such components are installed. Child sidecars may be smaller than, larger than, or the same size as a parent blade and may be stacked to the left, right, above, or below its parent blade. In some cases, the child sidecar may be another blade. Particularly when combined with the fact that sidecars may be stacked on top of each other, it is often difficult to determine which blade components are attached to which. This causes problems, for example, when a user decides to change the blade configuration just by looking at the physical devices as they cannot easily determine the current configuration. The difficulty in determining the current configuration of blades and sidecars can result in frustration, wasted time in trying to determine the configuration, and wasted resources when sidecars are not properly utilized.

One solution to this problem is for users to physically pull out a blade in order to ascertain which other blades and sidecars to which it is connected. Besides the time-consuming nature of this solution, such a solution does not provide an effective indication of sidecars that are not attached to any blade. A retracted blade also is not providing functionality while it is retracted. Moreover, a user would have to repeat the task of manually pulling out each blade if they forgot the configuration, and other users (e.g., other administrators from different shifts) would also have to perform the same task. Another solution would be to record (such as in a notebook) an indication of the current blade configuration, but such a solution is inefficient and prone to errors when administrators forget to update the log. There is, therefore, a need for an effective and efficient system to provide an indication of the configuration of blades that does not require retraction of the blades.

SUMMARY OF THE INVENTION

The problems identified above are in large part addressed by systems, methods, and media for providing visual indication of a blade configuration. Embodiments may include a visual blade configuration system with a chassis that partially encloses a cavity and a plurality of hot pluggable blades positioned within the cavity of the chassis and operably connected to the chassis, where each blade is adapted to be physically connected to one or more other blades, where the physically connected blades each form a visual indication device (VID) assembly. Embodiments may also include where each blade has one or more visual indication devices (VIDs) each having a plurality of states, where each of the visual indication devices changes its state to provide a visual indication of the VID assembly associated with its attached blade. The plurality of states may include different colors, alphanumeric characters, images, symbols, patterns, number of active elements, actions, animations, etc. In a further embodiment, each visual indication device may potentially change its state in response to detection of an addition or removal of a blade.

Another embodiment provides a method of providing an indication of a configuration of blades. Embodiments of the method may include determining an initial blade configuration and determining an initial configuration of visual indication devices based on the initial blade configuration, where the initial configuration includes a visual indication device state associated with one or more VID assemblies and where each VID assembly includes one or more physically connected blades. Embodiments of the method may also include configuring the visual indication devices based on the determined visual indication device initial configuration. Embodiments may also include detecting a change in configuration of the blades and, in response, determining a new configuration of the visual indication devices and reconfiguring the visual indication devices based on the new configuration.

Another embodiment provides a machine-accessible medium containing instructions that are effective when executed in a data processing system to cause the system to perform a series of operations for providing visual indication of a blade configuration. The series of operations generally includes determining an initial blade configuration and determining an initial configuration of visual indication devices based on the initial blade configuration, where the initial configuration includes a visual indication device state associated with one or more VID assemblies and where each VID assembly includes one or more physically connected blades. Embodiments of the series of operations may also include configuring the visual indication devices based on the determined visual indication device initial configuration. Embodiments of the series of operations may also include detecting a change in configuration of the blades and, in response, determining a new configuration of the visual indication devices and reconfiguring the visual indication devices based on the new configuration.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

Figure 1:
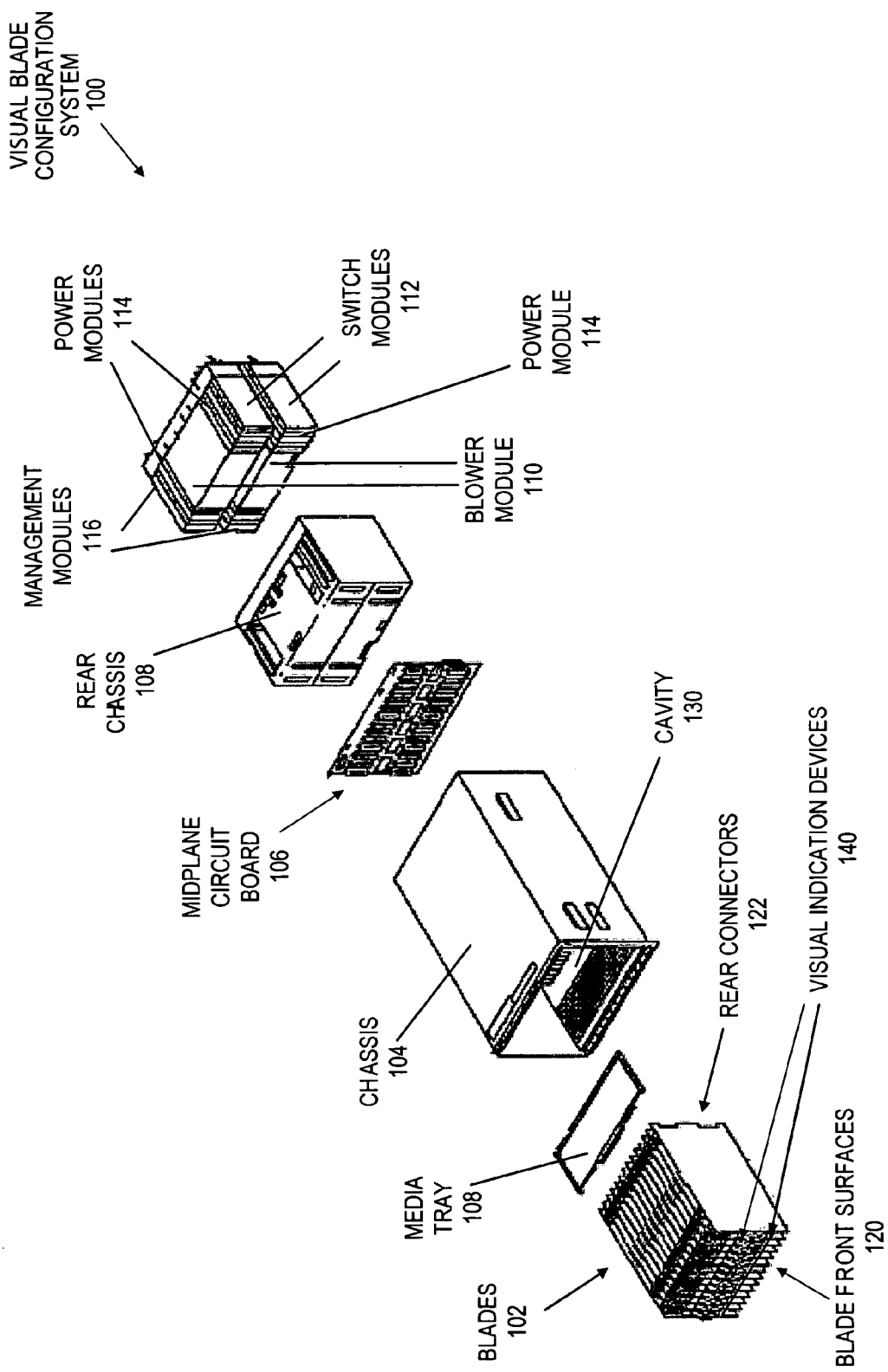
FIG. 1 depicts a front, top, and right side exploded perspective view of a visual blade configuration system with a chassis, blades, and visual indication devices according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods, and media for providing visual indication of a blade configuration are disclosed. Embodiments may include a visual blade configuration system with a chassis that partially encloses a cavity and a plurality of hot pluggable blades positioned within the cavity of the chassis and operably connected to the chassis, where each blade is adapted to be physically connected to one or more other blades, where the physically connected blades each form a visual indication device (VID) assembly. In general, physically connected blades are connected directly to each other instead of or in addition to simply being connected through other means like a chassis-wide midplane circuit board. Embodiments may also include where each blade has one or more visual indication devices each having a plurality of states, where each of the visual indication devices changes its state to provide a visual indication of the VID assembly associated with its attached blade. The plurality of states may include different colors, alphanumeric characters, images, symbols, patterns, number of active elements, actions, animations, etc. In a further embodiment, each visual indication device may potentially change its state in response to detection of an addition or removal of a blade.

The disclosed system may provide for an efficient and effective mechanism for providing an indication of the configuration of blades. The VID assembly for each blade may be indicated by the state of a visual indication device for each blade of a VID assembly, providing administrators or other users with an indication of which blades (including parents and sidecars) are attached or connected to each other. If colors are used to represent states, for example, one VID assembly may have red indications, another may have blue, and so on. By viewing the visual indication devices and their states, a user may quickly ascertain which blades are physically connected to each other and thus differentiate different VID assemblies, potentially eliminating the need to remove blades to determine physical connections and increasing the likelihood of detecting underutilized resources. In some embodiments, the disclosed system may advantageously dynamically change when blades are added or removed from the system, providing a robust solution for administrators. This aspect may, for example, change the color (or other state) of a VID assembly if another VID assembly with the same state indication is placed next to it or near it, minimizing any confusion.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Turning now to the drawings, FIG. 1 depicts a front, top, and right side exploded perspective view of a visual blade configuration system with a chassis, blades, and visual indication devices according to one embodiment. In the depicted embodiment, the visual blade configuration system 100 includes a chassis 104 partially enclosing a cavity 130 with an open front side that may receive one or more blades 102 to form a blade server. The embodiment of FIG. 1 includes fourteen blades 102 that may be hot-pluggable into the fourteen slots in the front of the chassis 104. The blades 102 and modules (except the midplane circuit board) of the visual blade configuration system 100 may be hot-pluggable so that if one fails it may be replaced without shutting down system power. An example visual blade configuration system 100 may be a modified International Business Machines (IBM) Corporation's IBM eServer™ BladeCenter® system, a high-density, rack-mounted packaging architecture for servers that provides input/output (I/O), systems management, and power to blades. One of ordinary skill in the art will recognize, however, that other types of visual blade configuration systems 100 may be utilized within the scope of the invention.

A media tray 108 may also be included within chassis 104. The media tray 108 may include a floppy disk drive and/or CD-ROM drive and may couple to any of the attached blades 102. The media tray 108 may also house an interface board on which is mounted interface light emitting diodes (LEDs), a thermistor for measuring air inlet temperature, and a USB controller hub. Each blade 102 may have a front surface 120 and one or more rear connectors 122. The rear connectors 122 of a blade 102 may operably connect to the chassis 104 by insertion into the midplane circuit board 106 located at the rear of the chassis 104. Blades 102 may interface with other components of the visual blade configuration system 100 via the midplane circuit board 106 via interfaces such as a power interface, communications or network interface (e.g., Ethernet, Fibre Channel), a management module serial link, a VGA analog video link, a keyboard/mouse USB link, a CD-ROM and floppy disk drive USB link, control signal link, or other interface. These interfaces may provide the ability to communicate to other components in the visual blade configuration system 100 such as management modules, switch modules, the CD-ROM, etc. These interfaces may also be duplicated to provide redundancy.

The visual blade configuration system 100 may also include a rear chassis 108 that contains a plurality of hot-swappable modules. The rear chassis 108 may attach to the rear of the chassis 104 for form the structure of the visual blade configuration system 100. Hot-swappable modules may include one or more blower modules 110, switch modules 112, power modules 114, and management modules 116. Blower modules 110 may include one or more variable-speed blowers to draw air from the front of the visual blade configuration system 100 and exhaust it to the rear in order to cool its components. Switch modules 112 may provide network and/or switch functions to the blades 102. An Inter-Integrated Circuit (I2C) Serial Bus Interface may be used by a management module 116 to configure, monitor and control the switch modules 112. Switch modules 112 may provide Ethernet connectivity in some embodiments, but may also provide Fibre Channel or other connectivity. Power modules 114 may provide DC operating voltages for the blades 102 and other components by, for example, converting power from an AC source.

Management modules 116 may provide basic management functions such as controlling, monitoring, alerting, restarting, and diagnostics to the visual blade configuration system 100, including the chassis, blades 102, modules, and shared resources. Management modules 116 may also provide functionality that allows an external data center management application to be used to help manage the visual blade configuration system 100. The management module 116 may consist of a processor and keyboard, video, and mouse (KVM) switch function and may be operably connected to other modules, the midplane circuit board 106, or other components. Management modules 116 may also work in conjunction with a baseboard management controller (BMC) of a blade 102 to manage the blade 102.

Blades 102 (which may also be known as server blades or processor blades) may not only perform processor or server functions but may also perform other functions, such as a storage blade that includes hard disk drives and whose primary function is data storage. Blades 102 may provide the processor, memory, hard disk storage and firmware of an industry standard server. In some embodiments, blades 102 may be general- or specific-purpose servers that contain components such as processors, memory, optional local integrated drive electronics (IDE) or Small Computer System Interface (SCSI) disk drives, Ethernet or other network controllers, the BMC, and power conversion circuitry to convert a 12 V DC input to the various voltages required by blade 102 electronics components. In addition, they may include KVM selection via a control panel, an onboard service processor, and access to the floppy and CD-ROM drives in the media tray 108. Each blade 102 may have a control panel with light-emitting diodes (LEDs) to indicate current status plus switches for power on/off, selection of server blade, reset, nonmaskable interrupt reset (NMI) for core dumps, or other functions. A daughter card (not shown) may be connected to a blade 102 via an onboard bus, connector or other interface to provide additional high-speed links to the switch modules 112.

Blades 102 may be hot-swapped without affecting the operation of other blades 102 in the visual blade configuration system 100. A blade 102 may typically be implemented as a single slot card but may, in some cases, require two or more slots. A blade 102 may use any microprocessor technology (i.e., be from any microprocessor family) as long as it is compliant with the mechanical and electrical interfaces (and is desirably consistent with the power and cooling requirements of the visual blade configuration system 100). Blades 102 may also contain a baseboard management controller (BMC) (not shown) to work in conjunction with the management module 116 to manage the blade 102. BMCs (which may also be known as local service processors) may support visual blade configuration system 100 functions, such as communication with the management modules 116, with the control panels and LEDs, with the control panel buttons for power on/off, etc., and with inventory, error reporting, and environmental monitoring and reporting. The BMCs may also support other functions such as serial over LAN (SOL) and wake on LAN (WOL).

Blades 102 may include server or processor blades as well as expansion blades. An expansion blade 102, also known as a 'sidecar', can be added to a base, or parent, blade 102 to expand its functionality by connecting the expansion blade 102 to bus, connector, or other interface bus of the parent. Sidecars may include blade storage expansion (BSE) units with hard drives, a PCI I/O expansion unit that can support a variety of PCI adapters, special function add-ons (e.g., a daughter card or a specialized processing unit), an expansion unit that may support additional I/O daughter cards, or any other expansion blade known now or later developed. Sidecars may also be an actual blade 102 in some embodiments. Sidecars may be stacked in layers (i.e., sidecar attached to sidecar attached to parent blade 102) and may be attached to any external surface of the blade 102 besides the front or rear. Other types of blades 102 may also be used, whether now in use or later developed, as one of ordinary skill in the art will recognize. Blades 102 may be physically connected, or attached, either when physically external or internal to the chassis 104. For example, a sidecar may mate with an already installed blade 102 by being inserted next to blade 102 until clicking into place. The same sidecar may have a release mechanism that may be depressed so that an operator may remove the sidecar from the chassis 104 without removing the blade 102 to which it was connected.

As will be described in more detail subsequently, each blade 102 (including sidecars) may include one or more visual indication devices 140 located on the front surface 120 of each blade 102. The visual indication devices 140 may, upon proper command, provide a visual indication of a VID assembly in which each blade is part. A VID assembly may include a blade 102 along with any other blades 102 or sidecars to which it is physically connected. A VID assembly may include, for example, a blade 102 that has two attached storage sidecars. A single blade 102 may serve as a VID assembly if it is not connected to any other blades 102. In the disclosed system, each blade 102 that is part of a particular VID assembly may have the same visual indication state for its visual indication device(s) 140. In the above example, the visual indication devices 140 of the connected blade 102 and two storage sidecars may each be in the same color state (i.e., all three red), have the same pattern, or other visual indication. An administrator viewing the visual blade configuration system 100 could then efficiently see which blades are part of that VID assembly. In a further embodiment, the state of the visual indication devices 140 may dynamically change in response to the removal or addition of blades 102 or sidecars. If, for example, changes to the blades 102 resulted in two adjacent VID assemblies having the same color, the disclosed system may dynamically change the state of one VID assembly to another color to prevent confusion. The disclosed systems accordingly may provide an efficient and effective methodology for providing an indication of the configuration of blades 102 to administrators or other users.

Figure 2:
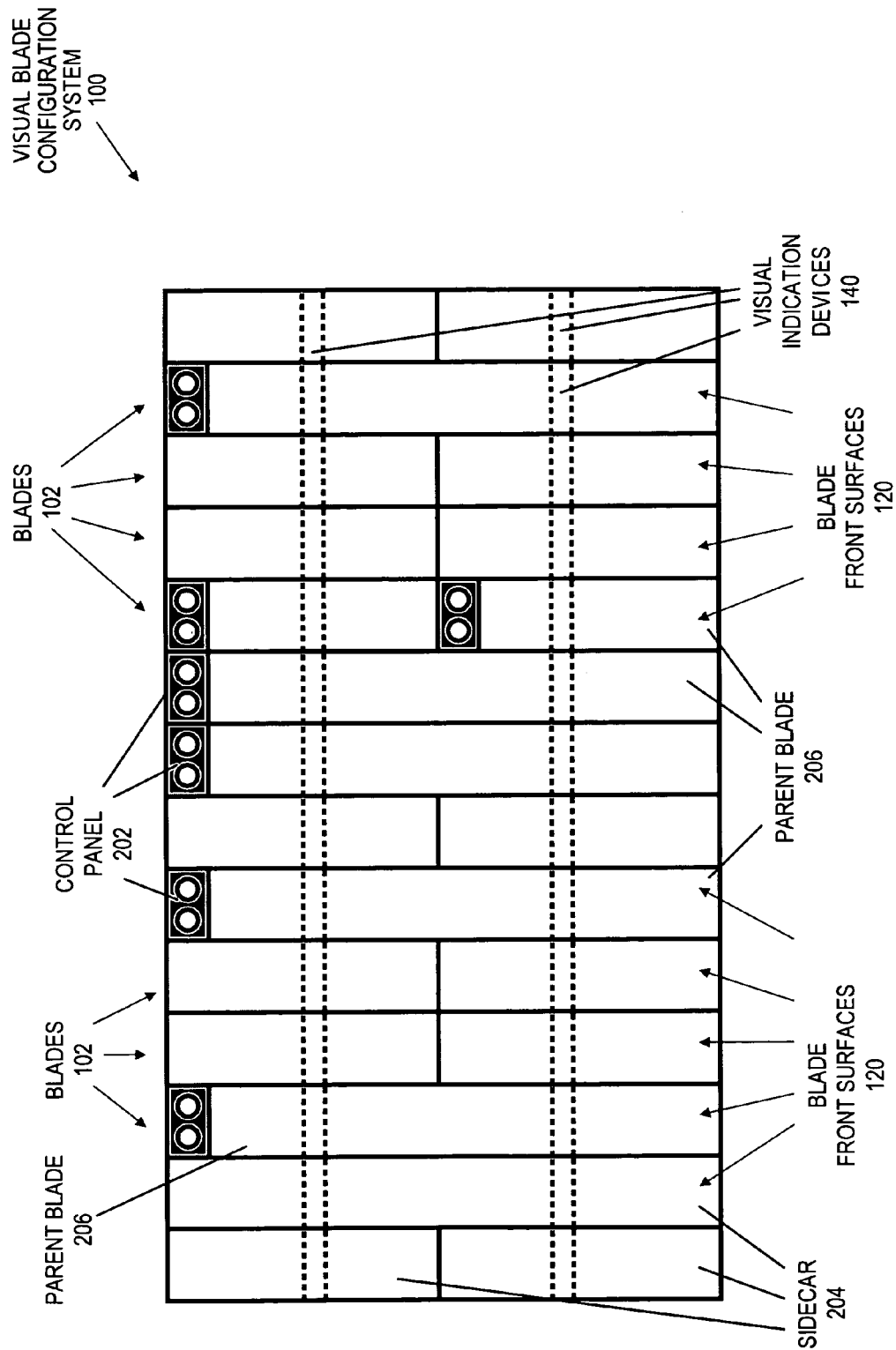
FIG. 2 depicts a front view of a visual blade configuration system with inactive visual indication devices on each blade according to one embodiment.

FIG. 2 depicts a front view of a visual blade configuration system 100 with inactive visual indication devices 140 on each blade 102 according to one embodiment. As described previously, the visual blade configuration system 100 may contain a plurality of blades 102 each having a blade front surface 120 that faces outward towards a user during normal usage. Some blades 102 may have a control panel 202 on the front surface 120 to provide status or other information. As also described previously, the control panel 202 may have both status indicators (i.e., LEDs) and buttons (e.g., power on/off, KVM selection, etc.).

Blades 102 may include both sidecars 204 and parent blades 206 where sidecars 204 may be physically connected to other sidecars 204 or parent blades 206. In the depicted embodiment, parent blades 206 each have a control panel 202. Each blade 102, including both sidecars 204 and parent blades 206, may include one or more visual indication devices 140. The visual indication devices 140 may be integrated into the chassis 104 or otherwise attached to the chassis 104, attached to the blades 102, may be retrofitted to the blades 102, may be integral to the blades 102, may be integrated with control panel 204, or otherwise positioned with the blade 102 so that they are visible from the front surface 120 of a blade 120. In the depicted embodiment, all of the visual indication devices 140 are in an inactive state, resulting in each appearing substantially similar to other visual indication devices 140. A user looking at the visual blade configuration system 100 may therefore be unable to determine which blades 102 are connected to which other blades 102 or sidecars. The user, for example, may be unable to determine whether the sidecars 204 to the left (as viewed from the perspective of FIG. 2) of the left-most parent blade 206 (with control panel 202) are connected to the parent blade 206. Similarly, the user may be unable to determine which parent blade 206 a sidecar 204 may be connected to when the sidecar 204 is positioned between two parent blades 206. This lack of insight as to the physical connections of different blades 102 may result in inefficiencies as users may have to physically remove blades 102 to determine their connections and may not know if some blades 102 are not being utilized.

Figure 3:
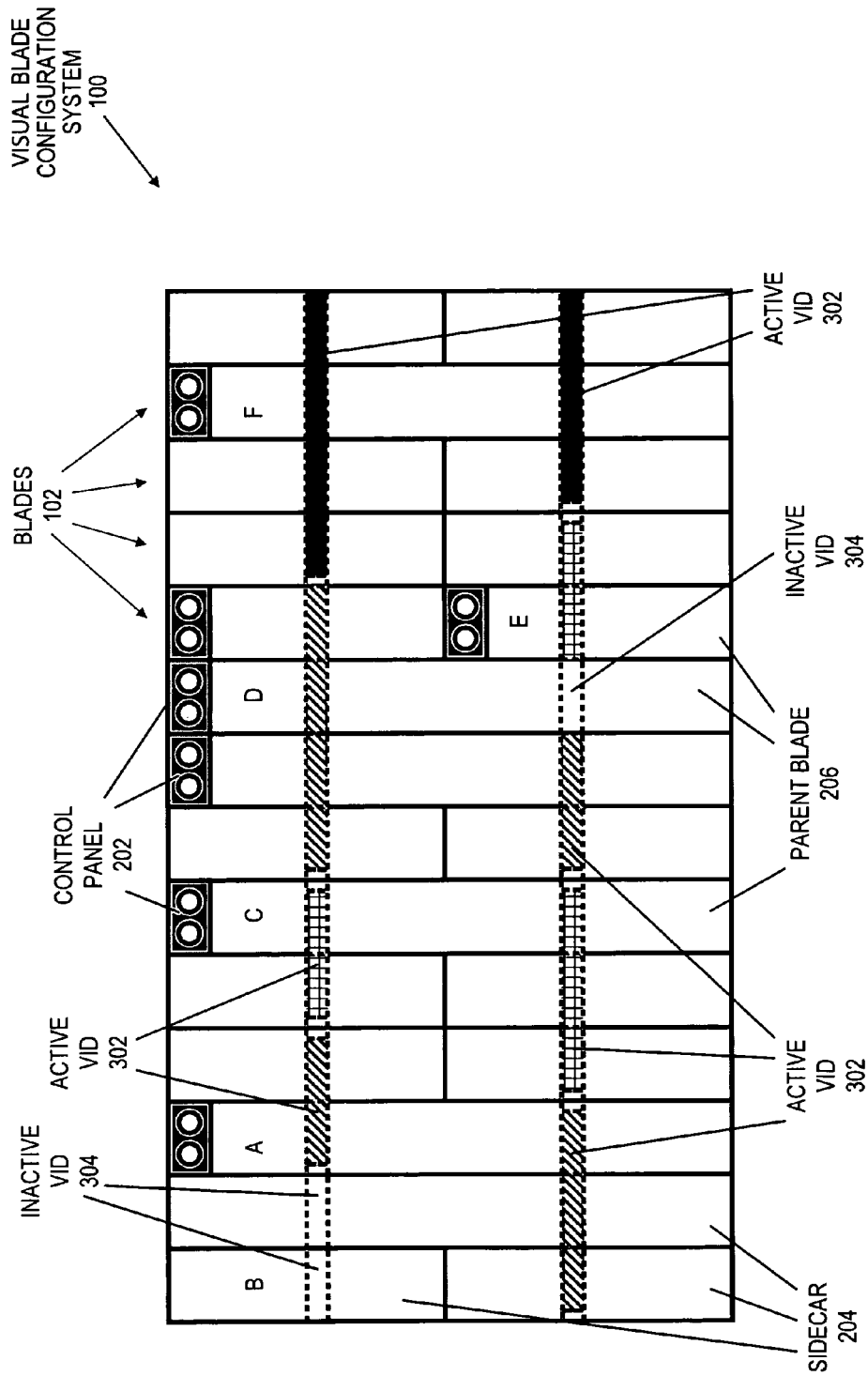
FIG. 3 depicts a front view of the visual blade configuration system of FIG. 2 with active visual indication devices in different states according to one embodiment.

FIG. 3 depicts a front view of the visual blade configuration system 100 of FIG. 2 with active visual indication devices 140 in different states according to one embodiment. In FIG. 3, the depicted visual indication devices 140 include both active visual indication devices (VIDs) 302 and inactive visual indication devices 304. The depicted active visual indication devices 302 are also in multiple states that represented by different patterns in FIG. 3 (e.g., diagonal lines, cross-hatching, solid patterns), with each pattern representing a different state. Each different state of the active visual indication devices 302 may indicate a different VID assembly of connected blades 102. In other words, blades 102 with active visual indication devices 302 that appear the same are physically connected to each other.

In some embodiments, different VID assemblies of the visual blade configuration system 100 of FIG. 3 are represented by different states of their active visual indication devices 302. For example, a user may determine that VID assembly 'A' of FIG. 3 (as represented by the letter 'A' on the depicted parent blade 206) includes all blades 102 that have active visual indication devices 302 displaying a diagonal line pattern. In the depicted embodiment, the VID assembly may thus include the labeled parent blade 206, the full sidecar 204 immediately to its left, the half-sidecar 204 in the lower left of the visual blade configuration system 100 (attached to the full sidecar 204), and the upper half-sidecar to the right of the parent blade 206. By looking at the visual indication devices 140, the user may quickly ascertain all blades 102 in the VID assembly of parent blade 206 'A' without having to physically remove the parent blade 206 or any of the blades 102 attached to the parent blade 206. In one embodiment, blades 102 may have multiple areas of visual indication devices 140, such as the sidecar 204 to the left of parent blade 206 'A', to provide additional flexibility and to account for half-blades or other alternative designs. In these embodiments, the activation state of either or both of the visual indication devices 140 may indicate its VID assembly. The example sidecar 204 has one inactive visual indication device 304 and one active visual indication device 302 (with the diagonal lines) and may be considered to be active in this example.

The disclosed system may also advantageously provide an indication of sidecars 204 that are not connected to a parent blade 206 and are thus not part of a VID assembly. Sidecar 204 'B', as depicted in FIG. 3, is only showing an inactive visual indication device 302 as it is not connected to any VID assembly. Without the presence of other, active visual indication devices 302 to illustrate that the sidecar 204 labeled 'B' is not connected to a VID assembly, a user cannot easily determine that the sidecar 204 is unconnected. The lack of a connection to a VID assembly may indicate, for example, that sidecar 204 'B' has been inadvertently been left unconnected or that its connection with an adjacent blade 102 has failed.

Other VID assemblies are also depicted in FIG. 3. VID assembly 'C.', for example, is represented by a cross-hatch pattern and includes a parent blade 206 with two half-sidecars 204 positioned to its left and a third half-sidecar 204 stacked on the lower of the two half-sidecars 204. VID assembly 'D' is represented by a diagonal pattern and includes a parent blade 206 with the letter 'D', two blades 102 with control panels 202, and two half-side sidecars 204 to their left are connected. In this embodiment, a pattern or other state may be repeated as long as the same pattern for different VID assemblies is never used for adjacent systems. In an alternative embodiment, a pattern or other state may be repeated as long as the same pattern for different VID assemblies is never used by nearby systems (i.e., a user-definable separation defined, for example, as two or more VID assemblies away). In the depicted embodiment, VID assemblies 'A' and 'C' both use a diagonal line pattern but they are separated by VID assembly 'C' and its cross-hatch pattern. In other embodiments where more visual indication device 140 states are available, duplication of states can be eliminated. VID assembly 'E' includes a half-size parent blade 206 and one attached half-sidecar 204 all represented with a cross-hatch pattern of the active visual indication devices 302. Lastly, VID assembly 'F' with a solid pattern of active visual indication devices 302 includes a parent blade 206 with five attached sidecars 204.

Visual indication devices 140 may have many various types of differences between inactive and active states as well as different active states. The use of color provides significant flexibility in visual indication devices 140 according to some embodiments. For example, visual indication devices 140 may represent different active states with different colors, resulting in different VID assemblies being 'labeled' with different colors. One VID assembly could be red, for example, while the adjacent one is blue. An inactive visual indication device 304 may be represented by the absence of color (e.g., lights off) or a different color, depending on the technology involved and its implementation. Colors may advantageously be made to contrast sharply against one another to make them more easily distinguishable by selection of, for example, complementary colors (green complements red, orange complements blue, and so on).

In other embodiments, different states may be represented by different patterns (or the absence of a pattern), as depicted in the embodiment of FIG. 3. While using colors may often be aesthetically pleasing, utilizing patterns or other types of state may be more appropriate for color-blind or other visually-impaired sensitive implementations. Other embodiments are also possible, such as representing different states based on alphanumeric characters (i.e., letter, numbers, etc.), images (e.g., designs or logos, etc.), symbols (e.g., Greek letters, shapes, etc.), number of active elements (e.g., number of active lights), actions (e.g., flashing or blinking, brightness level, etc.), or animations (e.g., flashing arrow, sequential activation/inactivation of lights, lights giving the appearance of motion, etc.). In one example with alphanumeric characters, all blades 102 part of one VID assembly may have an LCD indicating the number '2', another VID assembly may have an LCD indicating the number '3', and so on.

Visual indication devices 140 may also use a combination of states, such as using color and patterns to provide opportunities for more states. For example, a visual indication device 140 could have red, green and blue lights that illuminate three different patterns (solid, cross-hatch, and diagonal) to give nine options for states. This combination may also be useful in being aesthetically pleasing (because of the colors) while still being color-blind or other visually-impaired sensitive (because of the patterns). In some embodiments, a user may be able to select the type of states they desire via hardware or software, such as by choosing a pattern instead of a color.

In an alternative embodiment, the visual indication devices 140 may also be used to indicate the parent blade 206 of a VID assembly. As can be seen from FIG. 3, a user viewing VID assembly 'D' may not know which blade 102 of the assembly is the parent blade 206. To provide this indication, the visual indication devices 140 of either or both of the parent blade 206 and non-parent blades 102 may be modified. For example, the visual indication devices 140 on the parent blade 206 may be animated by flashing on and off or may otherwise be different than that of non-parent blades 102. In another example, blades 102 with visual indication devices 140 that include three LEDs may become active and inactive sequentially, allowing, for example, the visual indication devices 140 of one blade 102 to turn on/off sequentially from left to right to indicate that the parent blade 206 is somewhere to the right. Other blades 102 of the VID assembly positioned to the right of the parent blade 206 may similarly 'point' to the left. In other embodiments, visual indication devices 140 that show alphanumeric text may label the parent blade 206. By providing an indication of a parent blade 206, the disclosed system may provide additional information to a user. This may be particularly useful as removal of a parent blade 206 may also stop the operation of any add-on blades 102.

Visual indication devices 140 may be any type of device that has different physical states that appear differently. In one embodiment, the visual indication devices 140 may be LEDs similar to those of control panel 204 (and may optionally integrated with control panel 204) and may be different colors, intensities, etc. In another embodiment, the visual indication device 140 may include a combination of LEDs and acrylic light pipes. The number of LEDs and light pipes required depends on the implementation, but optimally the minimum number of light pipes and LEDs should be used to identify each VID assembly. In one embodiment, one or more acrylic light pipes may be 'lit' by three LEDs (red, green, and blue) to create a large number of colors by controlling the intensity of each color LCD by pulse-width modulation. The ratio of LED on and off times may thus generate over a hundred different colors. By providing a large number of colors, each VID assembly may be represented by a different color. Light pipes may typically be clear and may be connected to an LED on either or both ends of the light pipe so that, when the LEDs illuminate, the light pipe takes on the color of the LEDs. A light pipe-based visual indication device 140 may, for example, include a light pipe that runs across the front of a blade 102.

Visual indication devices 140 may also utilize other types of technology. Visual indication devices 140 may, for example, use liquid crystal display (LCD) screens that may show different colors, images, symbols, patterns, etc. In another embodiment, visual indication devices 140 may be colored lights or multiple lights (where the number of active lights indicates its state, such as one system with two active lights and another system with three) in which the appropriate number or colors light when needed. One of ordinary skill in the art will recognize that other alternative technologies for the visual indication device 140 are possible and within the scope of the invention.

Figure 4:
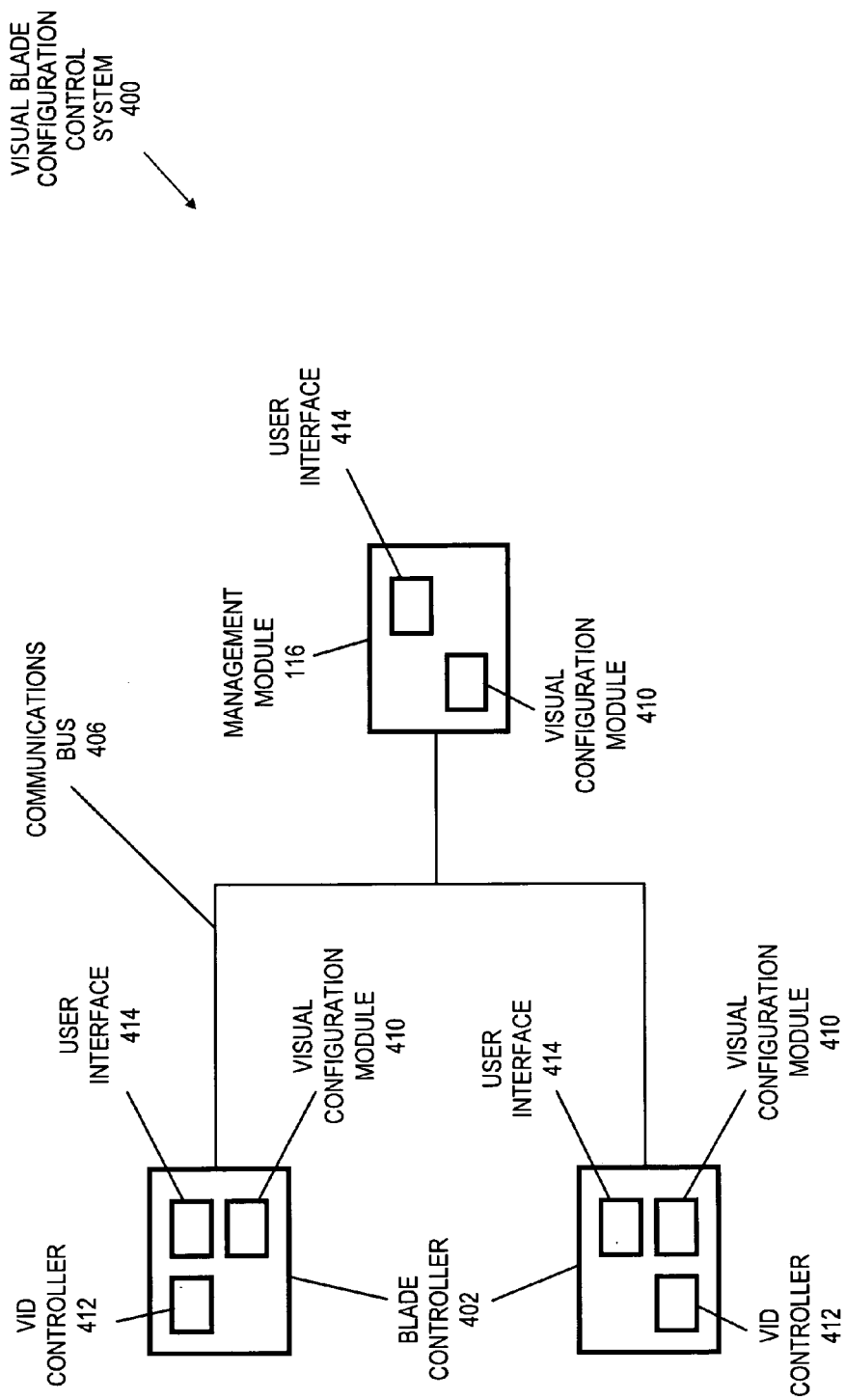
FIG. 4 depicts a conceptual illustration of software components of blade controllers and a management module according to one embodiment.

As described in more detail in relation to FIG. 4, visual indication devices 140 may be controlled by hardware and/or software. In one embodiment, the control logic for the visual indication devices 140 may be contained in a blade 102 itself. In other embodiments, the control logic may be contained in the blade chassis 104, such as in a management module 116. In yet another embodiment, the control logic may be external to the blade chassis 104 itself. In some embodiments, the visual indication devices 140 may be on when the visual blade configuration system 100 is powered while in other embodiments they may be toggled on via hardware (e.g., button or switch) or software.

The state of the visual indication devices 140 may also be dynamically controlled in some embodiments, as will be described in more detail in relation to FIGS. 4 and 5. For example, if a blade 102 is removed or added to the visual blade configuration system 100 the states of the various visual indication devices 140 may be modified appropriately. If a visual blade configuration system 100 is using colors, for example, and two separate VID assemblies that are not adjacent both have 'blue' states a user will still be able to distinguish them. If, during the operation of the visual blade configuration system 100, one of those VID assemblies is dynamically built out during operation via hot module adds and the two blue VID assemblies become adjacent, the disclosed system may determine that one VID assembly needs to change color and may make such change accordingly. As will be described in more detail, the decision as to which VID assembly needs to change and to what color may be negotiated between the blades 102 or may be made by a local or remote management entity.

FIG. 4 depicts a conceptual illustration of software components of blade controllers and a management module according to one embodiment. The disclosed blade connection visual indication system 400 includes one or more management modules 116 in communication with a plurality of blade controllers 402 via a communications bus 406 or, alternatively, a network. Components of the visual blade configuration control system 400 may control the visual indication devices 140 of a visual blade configuration system 160 and, in some embodiments, may dynamically change the configuration of the visual indication devices 140 in response to the removal or addition of blades 102 to the visual blade configuration system 100. This functionality may be accomplished by any of one or more blade controllers 402, one or more management modules 116, or other, alternative components, or a combination thereof.

The blade controllers 402, in one embodiment, may be baseboard management controllers (BMCs), or local service processors, of a blade 102 that communicate with the management module 116. In one embodiment, each blade 102 may have a blade controller 402. Alternatively, the blade controllers 402 may be separate from the BMC of a blade 102, such as a special-purpose module for controlling visual indication devices 140. In the depicted embodiment, the blade controllers 402 include a visual configuration module 410, a visual indication device (VID) controller 412, and a user interface 414. The depicted management module 116 also has a visual configuration module 410 and a user interface 414. The visual configuration module 410 may determine an arrangement of visual indication devices 140 based on the physical connections between blades (and their formation into VID assemblies). The visual configuration module 410 may, in some embodiments, work with the visual configuration modules 410 of other blade controllers 402 and/or of management modules 116 to perform its task. For example, in some embodiments the visual configuration modules 410 of the blade controllers 402 may communicate with the visual configuration module 410 of the management module to receive commands. In these embodiments, the visual configuration module 410 of the management module 116 may serve as the 'master' module and make determinations as to the visual indication device 140 configuration based on inputs received from the blade controllers 402. In other embodiments, the management module 116 need not be involved and visual configuration modules 410 of different blade controllers 402 may negotiate or otherwise determine an appropriate configuration. In an alternative embodiment, an external management entity such as an external data center management application may perform the functions of the visual configuration module 410.

Once the visual configuration module(s) 410 has determined a visual indication device 140 configuration, it may send a command or request to the VID controller 412 to implement the new configuration. The VID controller 412 may activate, inactivate, or change the state of the visual indication devices 140 of that blade 102 and blades that are part of its VID assembly in response to the request or command. In one example, the VID controller 412 of a blade 102 with an acrylic light pipe/LED visual indication device 140 may control the pulses of the red, green, and blue LEDs to achieve the desired color of the light pipes. One skilled in the art will recognize that any type of methodology for controlling the visual indication devices 140 may be suitable.

The blade controllers 402 may optionally include a user interface 414 to receive input from a user relating to the operation of the visual blade configuration system 100. A user, for example, may wish to choose the type of visual indication device 140 they desire to be used if such option is available. In other embodiments, a user may manually request for a particular blade 102 to have its visual indication devices 140 in a particular state, such as when the system is manually controlled, to override the visual blade configuration control system 400, or other reasons. In other embodiments, a user may manually enable or disable the VID function at the blade 102 or chassis 104 level.

In some embodiments, the VID controllers 412 may provide an indication to its operator of the current state of different VID assemblies. In another embodiment, an operator may view and alter the current state of the visual indication devices 140 of different VID assemblies via a web browser interface. This may allow, for example, a remote debugger person to tell a local operator to remove a blade 102 or to push a button on a particular VID assembly (i.e., push the reset on a 'blue' system), facilitating communication between distributed personnel.

Figure 5:
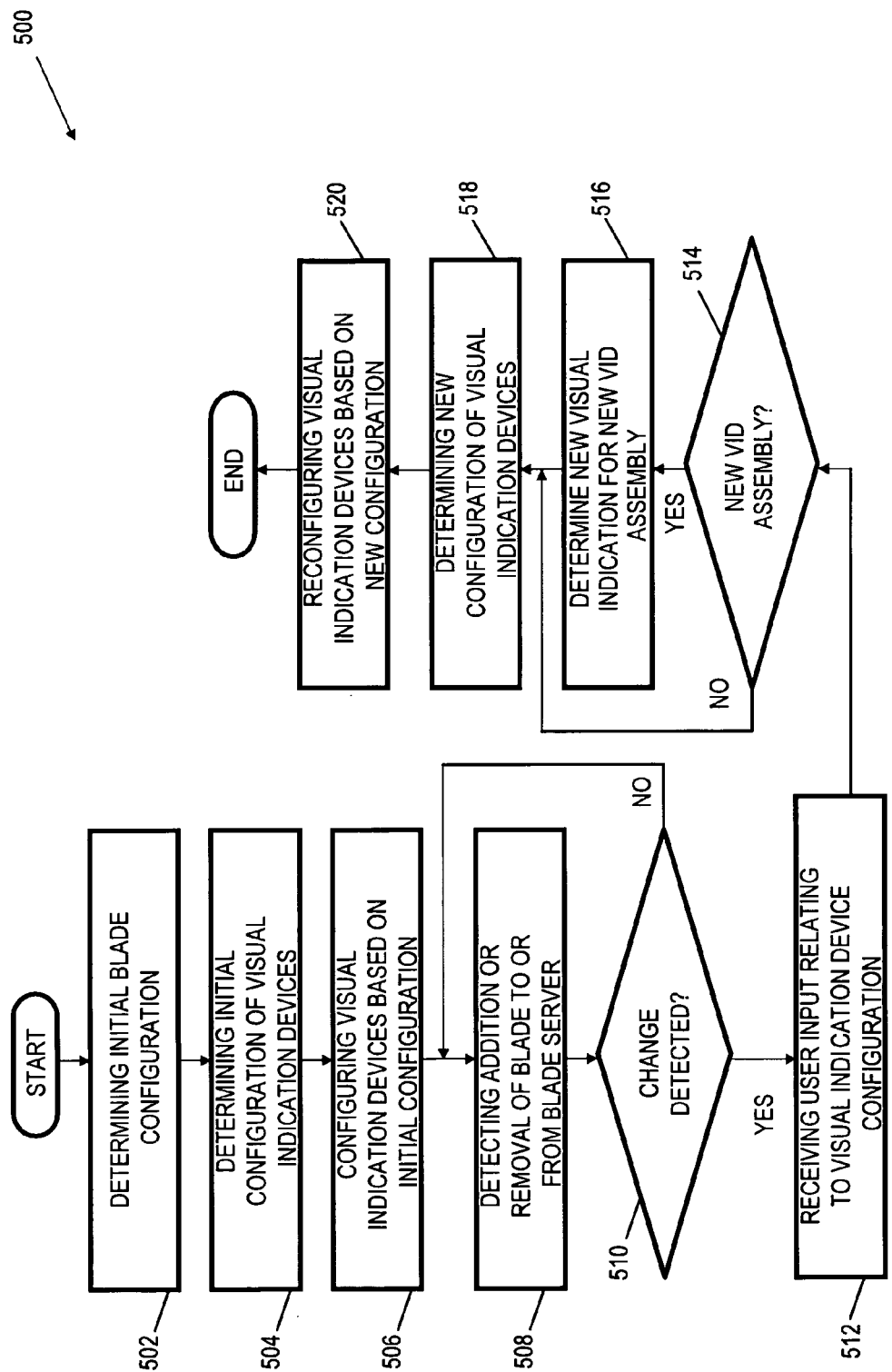
FIG. 5 depicts an example of a flow chart depicting dynamically reconfiguring visual indication devices according to one embodiment.

FIG. 5 depicts an example of a flow chart depicting dynamically reconfiguring visual indication devices according to one embodiment. Components or combinations of components of the visual blade configuration control system 400 may perform the elements of flow chart 500 in one embodiment. Flow chart 500 begins with element 502, where a visual configuration module 410 may determine an initial blade 102 configuration, including all blades 102 (including sidecars 204) currently installed in the visual blade configuration system 100. In some embodiments, the visual configuration module 410 may have the ability to detect which blades 102, including sidecars 204, are currently installed in the visual blade configuration system 100. In other embodiments, the visual configuration module 410 may receive an indication of the status of one or more blades 102 from another source, such as the visual configuration modules 410 of other blades 102 or a management module 116.

Once the initial configuration of blades 102 is known, the visual configuration module 410 may determine an initial configuration of visual indication devices 140 at element 504. The initial configuration of visual indication devices 140 may include an indication of the VIED assemblies of the visual blade configuration system 100 as currently configured. The initial configuration may also include a determination of the state of each visual indication device 140. The visual configuration module 410 may determine, for example, that there are three VID assemblies that neighbor each other and that they should be colored red, orange, and purple. After determining the initial configuration, the VID controllers 412 (such as on command from a visual configuration module 410) may at element 506 configure the visual indication devices 140 based on the initial configuration. Using the above example, the visual indication devices 140 of VID assembly one would be activated to show the color red, the visual indication devices 140 of VID assembly two would be activated to show the color orange, and the visual indication devices 140 of VID assembly three would be activated to show the color purple.

At element 508, the visual configuration module 410 may await a change in the blade 102 configuration, such as the addition or removal of a blade 102 from the visual blade configuration system 100. In some embodiments, the visual configuration module 410 may detect when a blade 102 is added or removed from the system. In other embodiments, the visual configuration module 410 may receive a notification that such a change has occurred, such as from another visual configuration module 410. In another embodiment, a user may input (such as by actuating a button) a notification that they have installed a new blade 102 or that they have or will remove a blade 102. In another embodiment, a user may input such notification by actuating the blade's lever or levers that insert or eject the blade 102. If no change is detected at decision block 510, the method of flow chart 500 returns to element 508 to continue waiting. If a change is detected, the method of flow chart 500 continues to optional element 512, receiving user input relating to the visual indication device 140 configuration. In this optional element, the user interface 414 may receive user input, which may include, for example, a user inserting a new VID assembly and providing a preference on the displayed state on its visual indication elements 140.

At decision block 514, the visual configuration module 410 may determine whether the detected change resulted in a new VID assembly. If a new VID assembly was added, the visual configuration module 410 may determine at element 516 a new visual indication for the new VID assembly. For example, the visual configuration module 410 may determine a state of the new VID assembly that is different than that of other systems so as to prevent confusion. In an alternative embodiment, the visual configuration module 410 may make such determination based on user input received at element 512. If no new VID assembly was added, the method of flow chart 500 may continue to element 518.

After the detected change, the visual configuration module 410 may determine a new configuration of the visual indication devices 140 at element 518. As at element 504, the visual configuration module 410 may determine a different state for each VID assembly or, alternatively, may determine states for each VID assembly that prevent adjacent systems from having the same state (while allowing duplication within the whole system). The VID controller 412 may then at element 520 reconfigure the states of the visual indication devices 140 based on the new, determined configuration, after which the method terminates. By reconfiguring the visual indication devices 140 based on the detected changes in blades 102, a dynamic reconfiguration of the visual indication devices 140 is achieved. The disclosed methodology may therefore provide an effective mechanism for differentiating different VID assemblies of a visual blade configuration system 100 and accounting for changes in its configuration.

Each software program described herein may be operated on any type of computer, such as a personal computer, server, etc. Any program may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for providing visual indication of a blade configuration. It is understood that the form of the invention shown and described in the detailed description and the drawings are to be taken merely as examples. It is intended that the following claims be interpreted broadly to embrace all the variations of the example embodiments disclosed.

While certain operations have been described herein relative to a direction such as "above" or "below" it will be understood that the descriptors are relative and that they may be reversed or otherwise changed if the relevant structure(s) were inverted or moved. Therefore, these terms are not intended to be limiting.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A visual blade configuration system, the system comprising:
   a chassis, the chassis partially enclosing a cavity;
   a plurality of hot pluggable blades positioned within the cavity of the chassis and operably connected to the chassis, wherein each blade is adapted to be physically connected to one or more other blades, the physically connected blades each forming a VID assembly of one or more physically connected blades; and the blades each comprising one or more visual indication devices having a plurality of states, wherein each of the visual indication devices changes its state in response to a change in configuration of the blades to provide an indication of any other blades physically connected to its attached blade by providing a visual indication of the VID assembly associated with its attached blade.

2. The system of claim 1, further comprising one or more management modules in communication with the plurality of blades.

3. The system of claim 1, wherein the plurality of blades comprises one or more of a processor blade, server blade, storage blade, sidecar, or expansion blade.

4. The system of claim 1, wherein the plurality of blades each comprise a baseboard management controller (BMC).

5. The system of claim 1, wherein the states for the visual indication devices comprise one or more of different colors, different alphanumeric characters, different images, different symbols, different patterns, different numbers of active elements, different actions, or different animations.

6. The system of claim 1, wherein each visual indication device comprises one or more of a LED, a liquid crystal display (LCD), a light, or a plurality of light pipes and a plurality of LEDs to provide light to the light pipes.

7. A method for providing an indication of a configuration of blades, the method comprising:
    determining an initial blade configuration;
    determining an initial configuration of visual indication devices based on the initial blade configuration, the initial configuration comprising a visual indication device state associated with one or more VID assemblies, wherein each VID assembly comprises one or more physically connected blades;
    configuring the visual indication devices based on the determined visual indication devices initial configuration;
    detecting a change in configuration of the blades, the change in configuration comprising a change in physical connections between blades;
    in response to detecting the change of configuration, determining a new configuration of the visual indication devices based on the detected change in configuration of the blades; and
    reconfiguring the visual indication devices based on the new configuration of visual indication devices.

8. The method of claim 7, further comprising determining that a new VID assembly has been added and determining a new visual indication state for the new VID assembly.

9. The method of claim 7, further comprising receiving a user input relating to visual indication device configuration.

10. The method of claim 7, wherein determining an initial blade configuration comprises one or more of detecting blades or receiving an indication of blades.

11. The method of claim 7, wherein determining an initial configuration of visual indication devices comprises one or more of determining a different state for each VID assembly, determining a state for each VID assembly so that adjacent VID assemblies have different states, or determining a state for each VID assembly so that nearby VID assemblies have different states.

12. The method of claim 7, wherein configuring the visual indication devices based on the determined initial configuration comprises changing a state of one or more visual indication devices, and wherein further the state comprises one or more of a color, alphanumeric character, image, symbol, pattern, number of active elements, action, or animation.

13. The method of claim 7, wherein detecting a change in configuration of the blades comprises one or more of detecting the addition of a blade, detecting the removal of a blade, receiving an indication of an addition of a blade, or receiving an indication of a removal of a blade.

14. The method of claim 7, wherein determining a new configuration of visual indication devices comprises one or more of determining a different state for each VID assembly, determining a state for each VID assembly so that adjacent VID assemblies have different states, or determining a state for each VID assembly so that nearby VID assemblies have different states.

15. The method of claim 7, wherein reconfiguring the visual indication devices based on the new configuration comprises changing a state of one or more visual indication devices, and wherein further the state comprises one or more of a color, alphanumeric character, image, symbol, pattern, number of active elements, action, or animation.

16. A machine-accessible medium containing instructions effective, when executing in a data processing system, to cause said data processing system to perform operations comprising:
    determining an initial blade configuration;
    determining an initial configuration of visual indication devices based on the initial blade configuration, the initial configuration comprising a visual indication device state associated with one or more VID assemblies, wherein each VID assembly comprises one or more physically connected blades;
    configuring the visual indication devices based on the determined visual indication devices initial configuration;
    detecting a change in configuration of the blades, the change in configuration comprising a change in physical connections between blades;
    in response to detecting the change of configuration, determining a new configuration of the visual indication devices based on the detected change in configuration of the blades; and
    reconfiguring the visual indication devices based on the new configuration of visual indication devices.

17. The machine-accessible medium of claim 16, wherein configuring the visual indication devices based on the determined initial configuration comprises changing a state of one or more visual indication devices, and wherein further the state comprises one or more of a color, alphanumeric character, image, symbol, pattern, number of active elements, action, or animation.

18. The machine-accessible medium of claim 16, wherein detecting a change in configuration of the blades comprises one or more of detecting the addition of a blade, detecting the removal of a blade, receiving an indication of an addition of a blade, or receiving an indication of a removal of a blade.

19. The machine-accessible medium of claim 16, wherein reconfiguring the visual indication devices based on the new configuration comprises changing a state of one or more visual indication devices, and wherein further the state comprises one or more of a color, alphanumeric character, image, symbol, pattern, number of active elements, action, or animation.

* * * * *